(12) United States Patent
Chiu et al.

(10) Patent No.: US 6,617,537 B1
(45) Date of Patent: Sep. 9, 2003

(54) METHOD FOR COMBINING A GOLF CLUB HEAD AND A BALL STRIKING PLATE

(75) Inventors: Chun-Feng Chiu, Kaohsiung (TW); Jung-Yao Tsai, Kaohsiung Hsien (TW)

(73) Assignee: Fu Sheng Industrial Co., Ltd., Taipei (TW)

( * ) Notice: Subject to any disclaimer, the term of this patent is extended or adjusted under 35 U.S.C. 154(b) by 0 days.

(21) Appl. No.: 10/094,711

(22) Filed: Mar. 12, 2002

(51) Int. Cl.$^7$ ................................................. B23K 26/20

(52) U.S. Cl. ............................ 219/121.14; 219/121.64; 228/136

(58) Field of Search .................. 219/121.12, 121.13, 219/121.14, 121.35, 121.63, 121.64; 228/136

(56) References Cited

U.S. PATENT DOCUMENTS

| 5,417,419 A | * | 5/1995 | Anderson et al. |
| 5,871,408 A | * | 2/1999 | Chen |
| 6,056,649 A | * | 5/2000 | Imai |

\* cited by examiner

Primary Examiner—Samuel M. Heinrich
(74) Attorney, Agent, or Firm—Bacon & Thomas, PLLC

(57) ABSTRACT

A method for combining a golf club head and a ball striking plate, includes the following steps: letting an outer edge of a ball striking plate and an inner edge of a recessed seat of a golf club head incline outward matingly, and forming an annular welding flange around a periphery of the recessed seat of the golf club head; using at least one press block to press the welding flange of the golf club head to form a deformation; using a high energy welding manner to melt and join an interface of the golf club head and the ball striking plate; and trimming the welded interface of the golf club head and the ball striking plate.

16 Claims, 5 Drawing Sheets

METHOD FOR COMBINING A GOLF CLUB HEAD AND A BALL STRIKING PLATE

BACKGROUND OF THE INVENTION

1. Field of the Invention

The present invention relates to a method for combining a golf club head and a ball striking plate, and more particularly to a method for combining a golf club head and a ball striking plate, wherein a high energy welding manner may be used to melt and join an interface of the golf club head and the ball striking plate, the outer edge of the ball striking plate and the inner edge of the recessed seat of the golf club head may be inclined outward matingly to facilitate assembly, and an annular welding flange is formed around the periphery of the recessed seat of the golf club head to serve as a packing weld material of the high energy welding manner.

2. Description of the Related Art

A conventional argon arc welding method for combining a golf club head and a ball striking plate in accordance with the prior art is shown in FIGS. 1 and 2. The combination comprises a golf club head 91 and a ball striking plate 92. The golf club head 91 and the ball striking plate 92 are combined integrally by using a welding arc 93 and a weld 94. The energy density of the welding heat source used by the argon arc welding is about 5×106 to 108 W/m2 only. Thus, the argon arc welding has a smaller permeation depth, so that it cannot be used to weld the metal at the deeper layer. In general, the golf club head 91 is provided with a recessed seat 911 to receive the ball striking plate 92. The top end of the inner annular face of the recessed seat 911 of the golf club head 91 is pre-fabricated with an inclined face 912 inclined outward, and the top end of the outer annular face of the ball striking plate 92 is pre-fabricated with an inclined face 921 inclined inward, so that the ball striking plate 92 may be placed in the recessed seat 911 of the golf club head 91 in a loose fit manner, thereby forming a welding gap between the ball striking plate 92 and the golf club head 91. Thus, during the argon arc welding, the surface metal at the welding gap may be melted by the welding arc 93, and the welding metal formed by the melted weld 94 may be filled into the welding gap, so that the ball striking plate 92 and the golf club head 91 may be combined in a welding manner.

The total heat produced in the argon arc welding process is very large, thereby inputting a very large heat energy into the ball striking plate 92 and the golf club head 91, so that the ball striking plate 92 and the golf club head 91 are easily deformed, thereby greatly affecting the smoothness of the ball striking plate 92 of the golf club head 91 after the argon arc welding process, and thereby forming large welding protruding spots 95 at the welding position. Thus, for overcoming the above mentioned drawback, the ball striking plate 92 is pre-provided a thickness of 0.3 to 0.5 mm, so that the deformation surface of the ball striking plate 92 and the welding protruding spots 95 after the argon arc welding process may be milled, thereby relatively complicating the manufacturing process and causing inconvenience in the working process. In addition, after the deformation surface of the ball striking plate 92 and the welding protruding spots 95 after the argon arc welding process are milled, the thickness of the ball striking plate 92 is uneven. Further, the argon arc welding has a smaller permeation depth, and cannot be used to weld the metal at the deeper layer. Thus, the deeper metal at the interface of the ball striking plate 92 and the golf club head 91 cannot be melted and joined efficiently, so that the ball striking plate 92 and the golf club head 91 are combined incompletely, thereby affecting the ball striking function of the golf club head 91.

SUMMARY OF THE INVENTION

For solving the above-mentioned shortcomings, the present invention is to provide a method for combining a golf club head and a ball striking plate, wherein a high energy welding manner, such as a laser welding process or an electronic beam welding process, may be used to melt and join an interface of the golf club head and the ball striking plate, the outer edge of the ball striking plate and the inner edge of the recessed seat of the golf club head may be inclined outward matingly to facilitate assembly, and an annular welding flange is formed around the periphery of the recessed seat of the golf club head to serve as a packing weld material of the high energy welding manner. Thus, the welding is rapid, the joint is complete, the welding deformation is very small, the ball striking plate may be worked previously before welding, the thickness of the ball striking plate after welding is even without needing additional weld material, thereby enhancing the welding velocity, reducing the cost, enhancing the quality of the product, and obtaining the golf club head having a better ball striking feature.

The primary objective of the present invention is to provide a method for combining a golf club head and a ball striking plate, a high energy welding manner may be used to entirely melt and join an interface of the golf club head and the ball striking plate, thereby enhancing the welding velocity, reducing the cost, enhancing the quality of the product, and obtaining the golf club head having a better ball striking feature.

A secondary objective of the present invention is to provide a method for combining a golf club head and a ball striking plate, wherein the outer edge of the ball striking plate and the inner edge of the recessed seat of the golf club head may be inclined outward matingly to facilitate assembly of the ball striking plate.

A further objective of the present invention is to provide a method for combining a golf club head and a ball striking plate, wherein the annular welding flange is formed around the periphery of the recessed seat of the golf club head to serve as a packing weld material of the high energy welding manner, without needing additional weld material, so that the welding velocity may be accelerated.

In accordance with the present invention, there is provided a method for combining a golf club head and a ball striking plate, comprising the steps of:

letting an outer edge of a ball striking plate and an inner edge of a recessed seat of a golf club head incline outward matingly, and forming an annular welding flange around a periphery of the recessed seat of the golf club head;

using at least one press block to press the welding flange of the golf club head to form a deformation;

using a high energy welding manner to melt and join an interface of the golf club head and the ball striking plate; and trimming the welded interface of the golf club head and the ball striking plate.

Further benefits and advantages of the present invention will become apparent after a careful reading of the detailed description with appropriate reference to the accompanying drawings.

DETAILED DESCRIPTION OF THE PREFERRED EMBODIMENTS

Referring to FIGS. 3–9, a method for combining a golf club head and a ball striking plate in accordance with a preferred embodiment of the present invention is shown.

Figure 3:
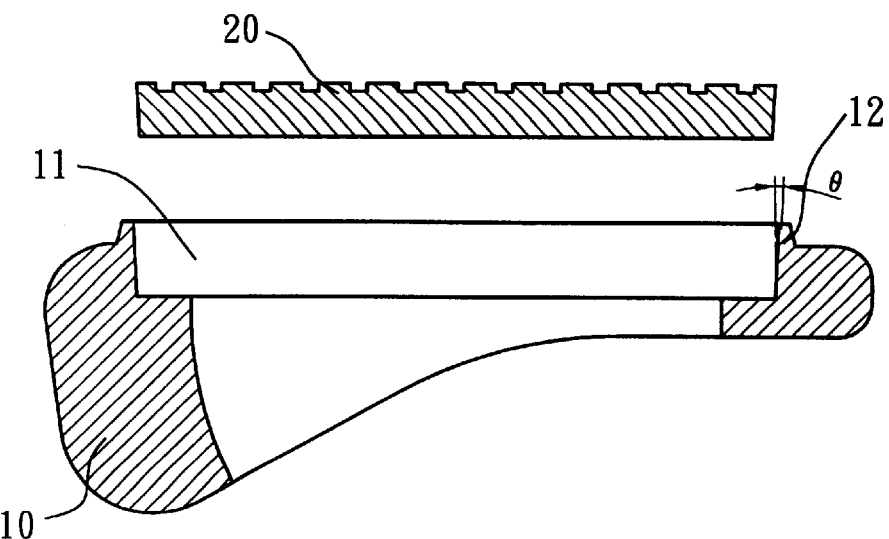
FIG. 3 is an exploded cross-sectional view of a golf club head and a ball striking plate in accordance with a preferred embodiment of the present invention.
Figure 4:
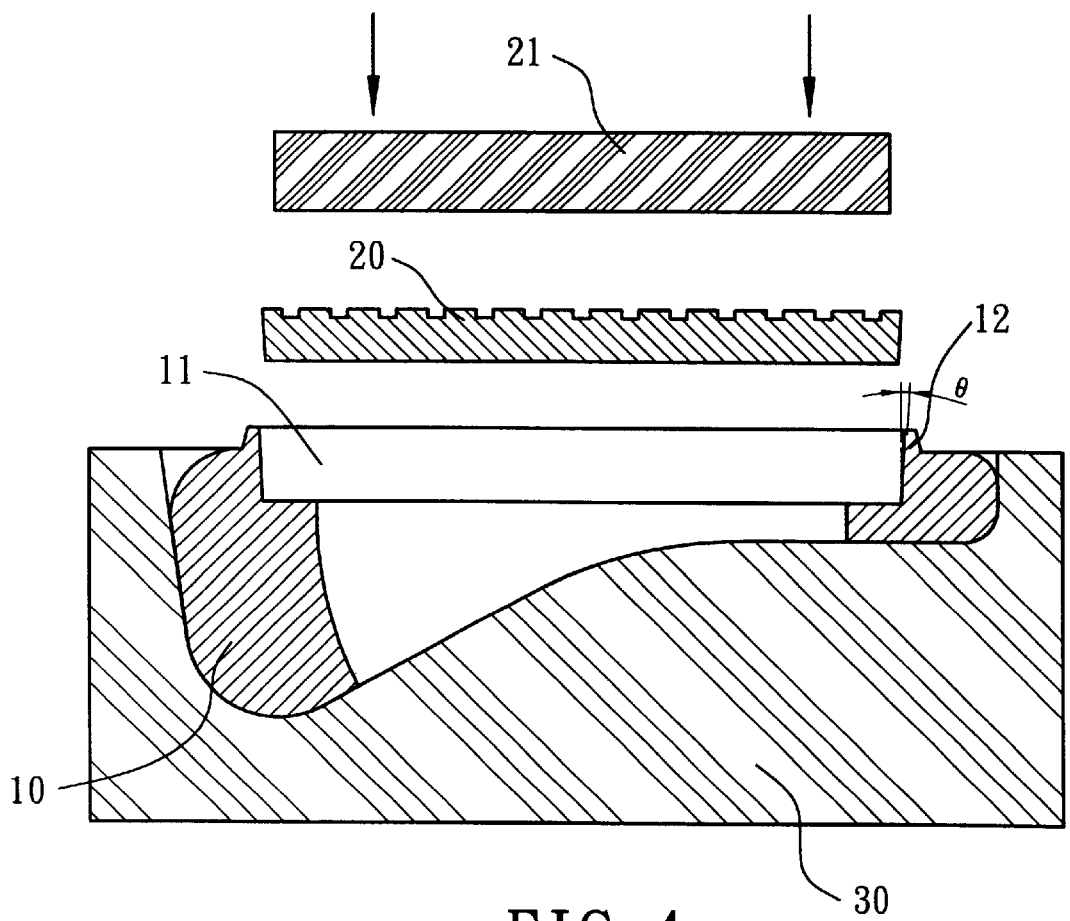
FIG. 4 is an exploded cross-sectional view of a golf club head and a ball striking plate in accordance with a preferred embodiment of the present invention, wherein the ball striking plate is placed in the recessed seat of the golf club head in a close fit manner by a small press block.
Figure 5:
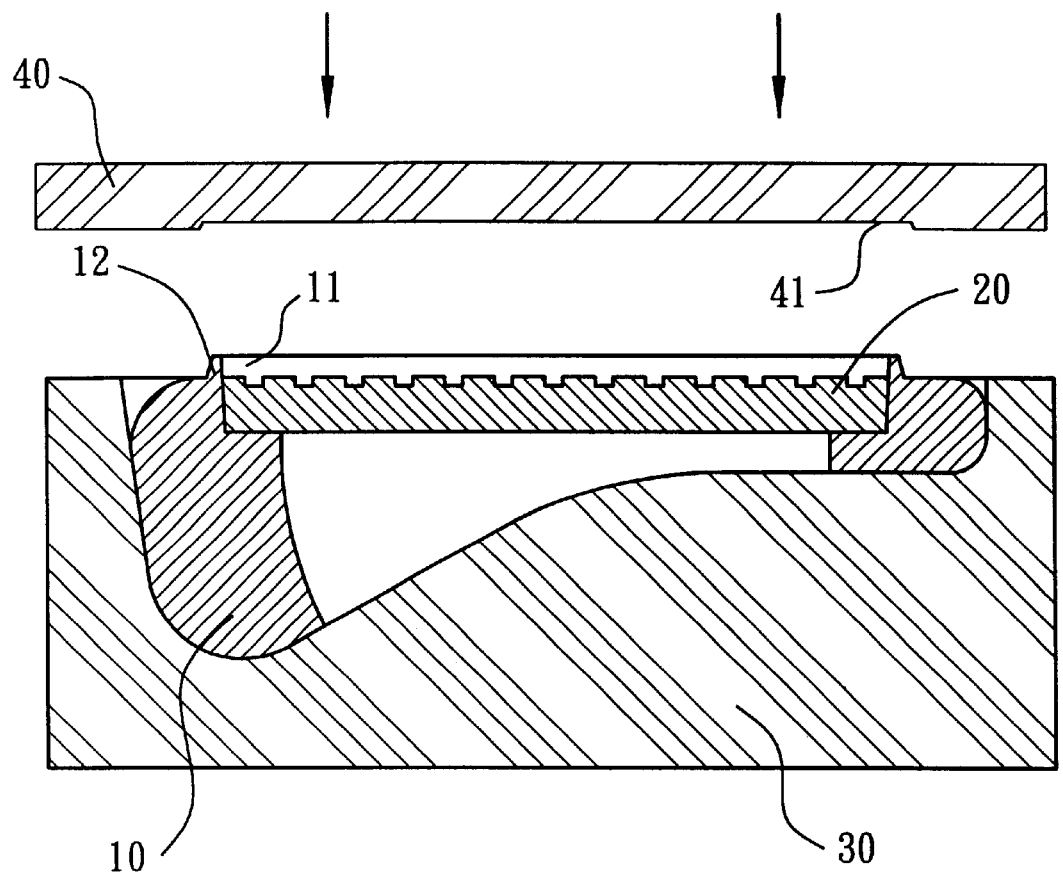
FIG. 5 is an exploded cross-sectional view of a golf club head and a ball striking plate in accordance with a preferred embodiment of the present invention, wherein the welding flange of the golf club head is pressed by a first press block.
Figure 6:
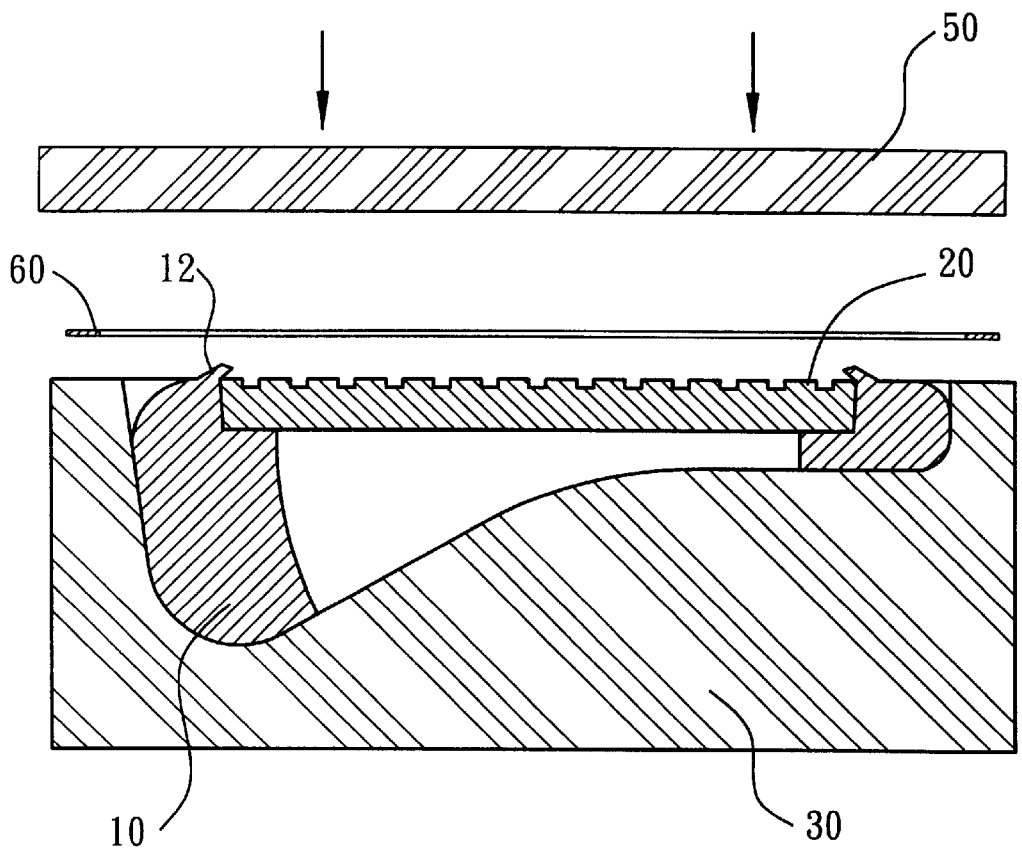
FIG. 6 is an exploded cross-sectional view of a golf club head and a ball striking plate in accordance with a preferred embodiment of the present invention, wherein the welding flange of the golf club head is pressed by a second press block.
Figure 7:
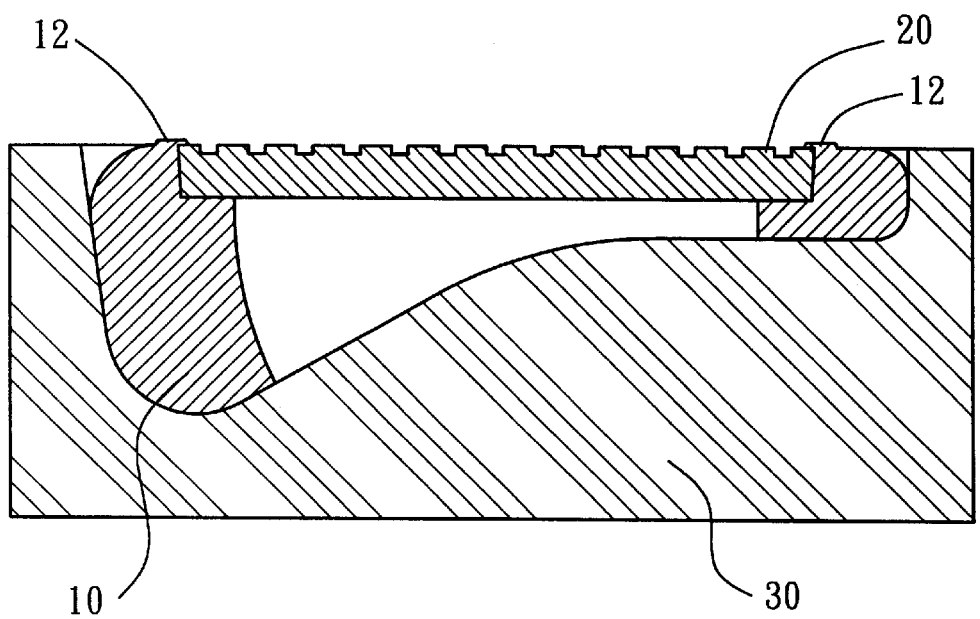
FIG. 7 is a cross-sectional assembly view of a golf club head and a ball striking plate in accordance with a preferred embodiment of the present invention, wherein the welding flange of the golf club head is pressed by the first press block and the second press block.
Figure 8:
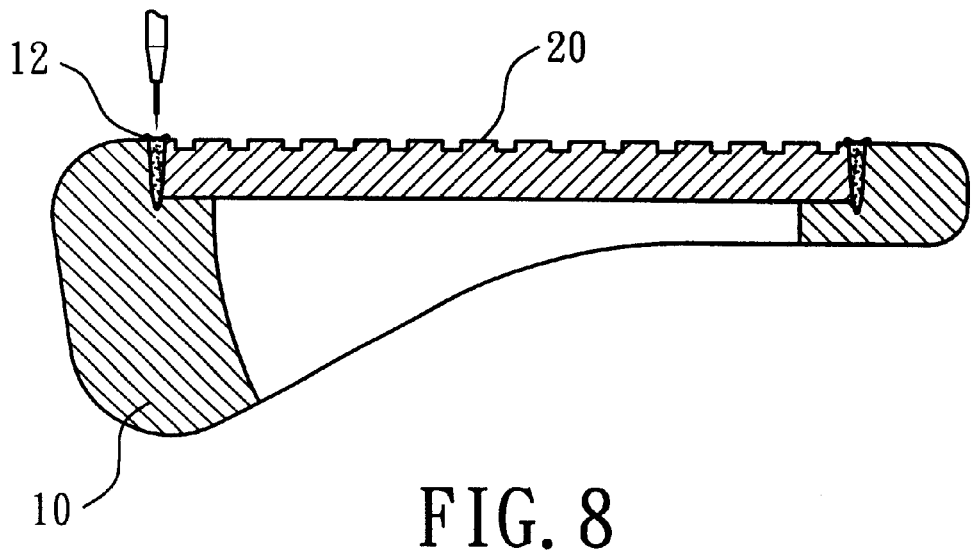
FIG. 8 is a cross-sectional assembly view of a golf club head and a ball striking plate in accordance with a preferred embodiment of the present invention, wherein the interface is treated by an energy welding process.
Figure 9:
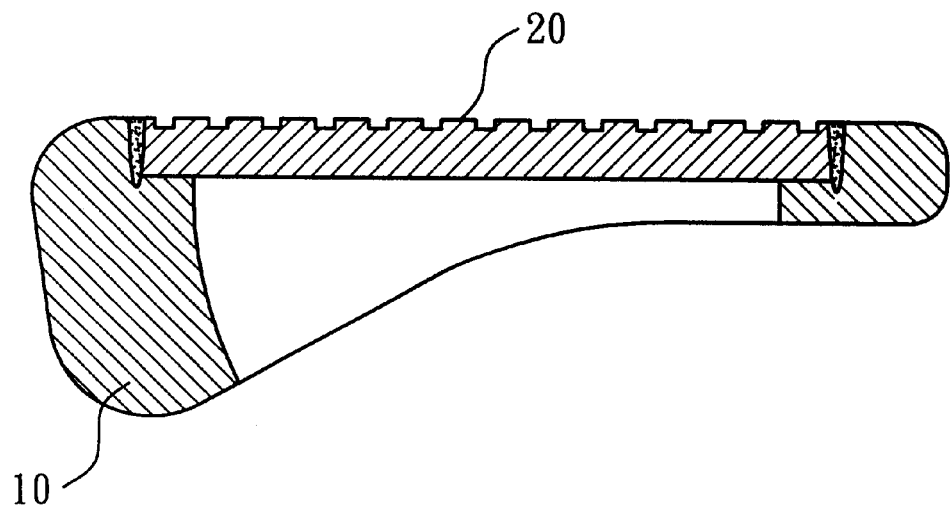
FIG. 9 is a cross-sectional assembly view of a golf club head and a ball striking plate in accordance with a preferred embodiment of the present invention, wherein the interface is treated by a polished process.

FIG. 3 is an exploded cross-sectional view of a golf club head and a ball striking plate in accordance with a preferred embodiment of the present invention. FIG. 4 is an exploded cross-sectional view of a golf club head and a ball striking plate in accordance with a preferred embodiment of the present invention, wherein the ball striking plate is placed in the recessed seat of the golf club head in a close fit manner by a small press block. FIG. 5 is an exploded cross-sectional view of a golf club head and a ball striking plate in accordance with a preferred embodiment of the present invention, wherein the welding flange of the golf club head is pressed by a first press block. FIG. 6 is an exploded cross-sectional view of a golf club head and a ball striking plate in accordance with a preferred embodiment of the present invention, wherein the welding flange of the golf club head is pressed by a second press block. FIG. 7 is a cross-sectional assembly view of a golf club head and a ball striking plate in accordance with a preferred embodiment of the present invention, wherein the welding flange of the golf club head is pressed by the first press block and the second press block. FIG. 8 is a cross-sectional assembly view of a golf club head and a ball striking plate in accordance with a preferred embodiment of the present invention, wherein the interface is treated by an energy welding process. FIG. 9 is a cross-sectional assembly view of a golf club head and a ball striking plate in accordance with a preferred embodiment of the present invention, wherein the interface is treated by a polished process.

Referring to FIGS. 3–9, the combination of a golf club head and a ball striking plate in accordance with a preferred embodiment of the present invention comprises a golf club head 10 and a ball striking plate 20. The welding equipment of the golf club head 10 and the ball striking plate 20 comprises a small press block 21, a support tool 30, a first press block 40, a second press block 50, and a washer 60. The method for combining a golf club head and a ball striking plate in accordance with a preferred embodiment of the present invention comprises the following steps: letting an outer edge of a ball striking plate 20 and an inner edge of a recessed seat 11 of a golf club head 10 incline outward matingly, and forming an annular welding flange 12 around a periphery of the recessed seat 11 of the golf club head 10; using a first press block 40 to press the welding flange 12 of the golf club head 10 to form an initial deformation; using a second press block 50 to further press the welding flange 12 of the golf club head 10 to form a further deformation; using a high energy welding manner to melt and join the interface of the golf club head 10 and the ball striking plate 20; and trimming and treating the welded interface of the golf club head 10 and the ball striking plate 20.

Referring to FIGS. 3 and 4, the first step of the method for combining a golf club head and a ball striking plate in accordance with a preferred embodiment of the present invention is to let an outer edge of a ball striking plate 20 and an inner edge of a recessed seat 11 of a golf club head 10 incline outward matingly, and to form an annular welding flange 12 around a periphery of the recessed seat 11 of the golf club head 10. In the preferred embodiment of the present invention, a small inclined angle $\theta$ is defined between the bottom and the top of the inner edge of the recessed seat 11 of the golf club head 10, and is defined between the bottom and the top of the outer edge of the ball striking plate 20, thereby facilitating a small press block 21 pushing the ball striking plate 20, so that the ball striking plate 20 may be inserted into the recessed seat 11 of the golf club head 10 in a close fit manner. Preferably, the inclined angle $\theta$ is smaller than 5°, and the optimum inclined angle $\theta$ is equal to 3°. In addition, the size of the outer diameter of the ball striking plate 20 and the size of the inner diameter of the recessed seat 11 of the golf club head 10 have to be controlled in a determined range, so as to prevent the ball striking plate 20 from being deformed by an excessive stress when the ball striking plate 20 is inserted into the recessed seat 11 of the golf club head 10, thereby affecting the flatness of the product, and so as to prevent the gap between the ball striking plate 20 and the recessed seat 11 of the golf club head 10 from being too large, thereby affecting the welding process. Thus, the precision of the size of the outer diameter of the ball striking plate 20 is preferably controlled in the range of ±0.05 mm. Preferably, the inner diameter of the bottom of the recessed seat 11 of the golf club head 10 is greater than the outer diameter of the bottom of the ball striking plate 20 by 0.05 mm. Preferably, the precision of the size of the inner diameter of the bottom of the recessed seat 11 of the golf club head 10 is controlled in the range of ±0.15 mm. Thus, after the ball striking plate 20 is inserted into the recessed seat 11 of the golf club head 10, the gap between the ball striking plate 20 and the recessed seat 11 of the golf club head 10 may be controlled in the range between 0 and 0.25 mm, and the gap is smaller than the diameter (0.3 to 0.5 mm) of the laser light beam of the high energy welding process. Further, if the gap between the ball striking plate 20 and the recessed seat 11 of the golf club head 10 is too small, the bottom side of the ball striking plate 20 can only press the inner wall (not numbered) of the recessed seat 11 of the golf club head 10, and cannot exactly press the annular face (not numbered) of the bottom of the recessed seat 11 of the golf club head 10. Thus, a support tool 30 may be used to support the combination of the golf club head 10 and the ball striking plate 20 rigidly and stably. Then, a small press block 21 may push the ball striking plate 20, so that the ball striking plate 20 may be exactly inserted into the recessed seat 11 of the golf club head 10 in a close fit manner. On the other hand, the ball striking plate 20 is pre-fabricated with a ball striking surface (not numbered) according to the usage of the golf club head 10 before the ball striking plate 20 is inserted into the recessed seat 11 of the golf club head 10. In addition, the welding flange 12 is preferably formed with the recessed seat 11 of the golf club head 10 integrally. Preferably, the welding flange 12 has an annular outer edge formed with an inclined face (not numbered), so that when the welding flange 12 is pressed, the metallic material of the welding flange 12 is deformed inward, thereby forming a thin metallic plate which covers the top of the interface of the golf club head 10 and the ball striking plate 20.

Referring to FIG. 5, the second step of the method for combining a golf club head and a ball striking plate in accordance with a preferred embodiment of the present invention is to use a first press block 40 to press the welding flange 12 of the golf club head 10 to form an initial deformation. After the ball striking plate 20 may be exactly inserted into the recessed seat 11 of the golf club head 10 in a close fit manner, the combination of the golf club head 10 and the ball striking plate 20 may use a first press block 40 to press the welding flange 12 of the golf club head 10 to form an initial deformation. The first press block 40 is formed with a recess 41 to mate with the welding flange 12 of the golf club head 10. The recess 41 is inclined, so that when the first press block 40 presses the welding flange 12 of the golf club head 10, the metallic material of the welding flange 12 may form an initial inward deformation by guidance of the recess 41.

Referring to FIGS. 6 and 7, the third step of the method for combining a golf club head and a ball striking plate in accordance with a preferred embodiment of the present invention is to use a second press block 50 to further press the welding flange 12 of the golf club head 10 to form a further deformation, thereby forming a thin metallic plate which covers the top of the interface of the golf club head 10 and the ball striking plate 20. In addition, when the second press block 50 further presses the welding flange 12 of the golf club head 10, the second press block 50 may mate with a washer 60, so as to control the pressing level of the second press block 50, so that the thickness of the welding flange 12 of the golf club head 10 after being pressed and deformed may be controlled. Thus, in the preferred embodiment of the present invention, the welding flange 12 of the golf club head 10 after being pressed and deformed may form a thin metallic plate which covers the top of the interface of the golf club head 10 and the ball striking plate 20, so that the thin metallic plate of the welding flange 12 of the golf club head 10 may function as a packing material to fill the gap at the interface of the golf club head 10 and the ball striking plate 20 during the welding process. In addition, the final thickness of the thin metallic plate of the welding flange 12 of the golf club head 10 may be controlled in the range of 0.80±0.20 mm.

Referring to FIG. 8, the fourth step of the method for combining a golf club head and a ball striking plate in accordance with a preferred embodiment of the present invention is to use a high energy welding manner to melt and join the interface of the golf club head 10 and the ball striking plate 20. In the preferred embodiment of the present invention, the high energy welding method includes a laser welding process or an electronic beam welding process. The high energy welding method includes the following advantages: the welding velocity is rapid, the permeation depth of the welding is large, the width of the welding path is small (about 1.2 to 2.0 mm), the heat influence of welding is very small, the deformation of the workpiece is very small, the surface of the workpiece will not be deformed due to the high temperature, and the combination strength of the welding path is high. In comparison with the laser welding process and the conventional argon arc welding process, the energy density of the conventional argon arc welding is about 5×106 to 108 W/m2, but the energy density of the laser welding of the present invention is about 1010 to 1012 W/m2. The width of the welding path of the conventional argon arc welding cannot be smaller than 5 mm. The width of the welding path of the laser welding of the present invention is about 1.2 to 2 mm, and the depth of the welding path of the laser welding of the present invention may reach a very deep field. The temperature of the workpiece after the conventional argon arc welding reaches 400 to 500° C., but the temperature of the laser welding of the present invention is about to 50 to 80° C. The welding strength of the conventional argon arc welding is about 60 to 80% of the original strength, but the welding strength of the laser welding of the present invention is greater than the original strength. Thus, in the preferred embodiment of the present invention, the gap (0 to 0.25 mm) at the interface between the golf club head 10 and the ball striking plate 20 is smaller than the diameter (0.3 to 0.5 mm) of the laser light beam. Thus, when the interface between the golf club head 10 and the ball striking plate 20 is melted and joined, the metallic material beside the gap at the interface between the golf club head 10 and the ball striking plate 20 may be melted by the laser light beam entirely, so that the golf club head 10 and the ball striking plate 20 may be combined integrally. Thus, the method of the present invention may obtain better productivity, welding strength and quality, and may simplify the working process.

Referring to FIG. 9, the fifth step of the method for combining a golf club head and a ball striking plate in accordance with a preferred embodiment of the present invention is to trim and treat the welded interface of the golf club head 10 and the ball striking plate 20, so that the golf club head 10 may have a smooth ball striking face. By the design of the combination manner of the golf club head 10 and the ball striking plate 20, the gap control, the design of the welding flange 12, and use of the laser welding, it is unnecessary to fill additional weld material, and the welding dent will not produce. Thus, only little welding residue is left on the welding path. The little welding residue may be trimmed easily.

Figure 1:
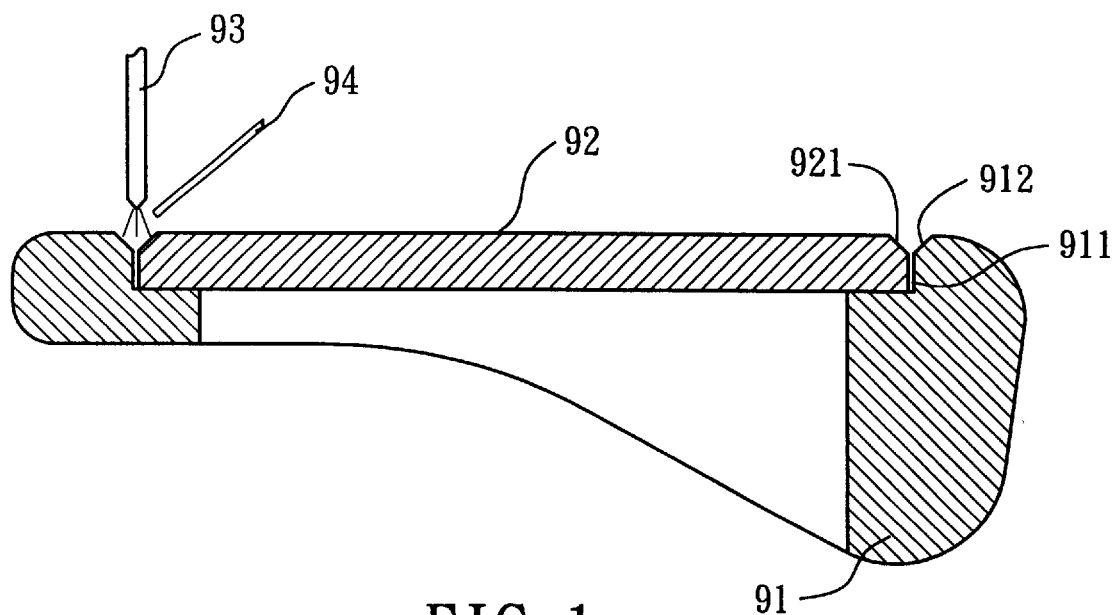
FIG. 1 is a cross-sectional assembly view of a conventional golf club head and a ball striking plate before the argon arc welding in accordance with the prior art.
Figure 2:
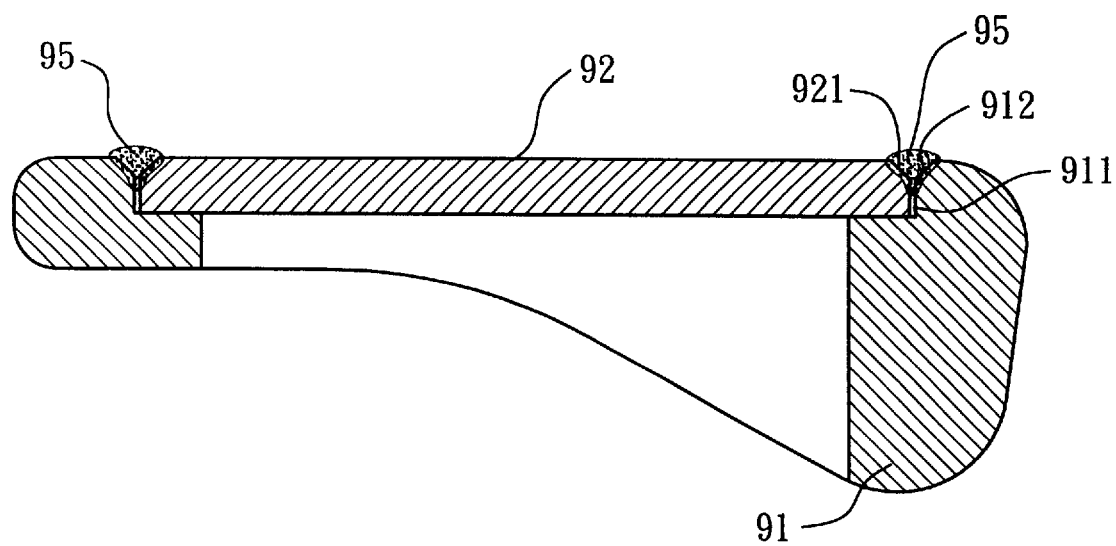
FIG. 2 is a cross-sectional assembly view of a conventional golf club head and a ball striking plate after the argon arc welding in accordance with the prior art.

Referring to FIGS. 2 and 9, in the method for combining a golf club head and a ball striking plate in accordance with a preferred embodiment of the present invention as shown in FIG. 9, the golf club head 10 is provided with a recessed seat 11 and a welding flange 12, and the outer edge of the ball striking plate 20 has an inclined angle of 3°, so that the ball striking plate 20 may be exactly inserted into the recessed seat 11 of the golf club head 10 in a close fit manner. The support tool 30 may be used to support the combination of the golf club head 10 and the ball striking plate 20 rigidly and stably. Then, the first press block 40 and the second press block 50 may in turn press the welding flange 12 of the golf club head 10, so that the welding flange 12 of the golf club head 10 may be deformed toward the interface of the golf club head 10 and the ball striking plate 20, to have a final thickness of 0.80±0.20 mm. Then, a high energy welding manner, such as a laser welding process or an electronic beam welding process, may be used to melt and join the interface of the golf club head 10 and the ball striking plate 20. In comparison with the conventional argon arc welding method for combining a golf club head and a ball striking plate in accordance with the prior art as shown in FIG. 2, the method for combining a golf club head and a ball striking plate in accordance with a preferred embodiment of the present invention may further accelerate the welding process, increase the productivity, increase the welding strength and quality, and simplify the working process.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A method for combining a golf club head and a ball striking plate, comprising the steps of:

letting an outer edge of a ball striking plate and an inner edge of a recessed seat of a golf club head incline outward matingly, and forming an annular welding flange around a periphery of the recessed seat of the golf club head;

using at least one press block to press the welding flange of the golf club head to form a deformation;

using a high energy welding manner to melt and join an interface of the golf club head and the ball striking plate; and trimming the welded interface of the golf club head and the ball striking plate.

2. The method for combining a golf club head and a ball striking plate as claimed in claim 1, wherein the high energy welding manner is a laser welding.

3. The method for combining a golf club head and a ball striking plate as claimed in claim 1, wherein the high energy welding manner is an electronic beam welding.

4. The method for combining a golf club head and a ball striking plate as claimed in claim 1, wherein a small press block is used to push the ball striking plate, so that the ball striking plate is exactly inserted into the recessed seat of the golf club head in a close fit manner.

5. The method for combining a golf club head and a ball striking plate as claimed in claim 1, wherein a first press block is used to press the welding flange of the golf club head to form an initial deformation, and a second press block is used to further press the welding flange of the golf club head to form a further deformation.

6. The method for combining a golf club head and a ball striking plate as claimed in claim 1, wherein a single press block is used to press the welding flange of the golf club head to form a deformation.

7. The method for combining a golf club head and a ball striking plate as claimed in claim 1, wherein each of the outer edge of the ball striking plate and the inner edge of the recessed seat of the golf club head is inclined outward matingly, thereby forming an inclined angle which is smaller than 5°.

8. The method for combining a golf club head and a ball striking plate as claimed in claim 1, wherein each of the outer edge of the ball striking plate and the inner edge of the recessed seat of the golf club head is inclined outward matingly, thereby forming an inclined angle which is equal to 3°.

9. The method for combining a golf club head and a ball striking plate as claimed in claim 1, wherein the gap at the interface between the golf club head and the ball striking plate is smaller than the diameter of the laser light beam or the electronic beam.

10. The method for combining a golf club head and a ball striking plate as claimed in claim 1, wherein a support tool is used to support the combination of the golf club head and the ball striking plate rigidly and stably, thereby facilitating the at least one press block pressing the welding flange of the golf club head.

11. The method for combining a golf club head and a ball striking plate as claimed in claim 1, wherein the welding flange has an annular outer edge formed with an inclined face inclined inward.

12. The method for combining a golf club head and a ball striking plate as claimed in claim 5, wherein the first press block is formed with a recess to mate with the welding flange of the golf club head.

13. The method for combining a golf club head and a ball striking plate as claimed in claim 5, further comprising using a washer to control a pressing level of the second press block, so that the thickness of the final deformation of the welding flange of the golf club head may be controlled.

14. The method for combining a golf club head and a ball striking plate as claimed in claim 1, wherein the welding flange of the golf club head is pressed to form a deformation, thereby forming a thin metallic plate which covers the interface of the golf club head and the ball striking plate, to serve as a packing weld material of the high energy welding manner.

15. The method for combining a golf club head and a ball striking plate as claimed in claim 14, wherein the final thickness of the welding flange after deformation is in the range of 0.80±0.20 mm.

16. The method for combining a golf club head and a ball striking plate as claimed in claim 1, wherein before the ball striking plate is inserted into the recessed seat of the golf club head, the ball striking plate is pre-fabricated with a ball striking face according to the usage of the golf club head.

* * * * *